(12) United States Patent
Uchida

(10) Patent No.: US 12,430,494 B2
(45) Date of Patent: Sep. 30, 2025

(54) INFORMATION DISPLAY CONTROL APPARATUS, INFORMATION DISPLAY CONTROL METHOD, AND COMPUTER READABLE STORAGE MEDIUM

(71) Applicant: CANON KABUSHIKI KAISHA, Tokyo (JP)

(72) Inventor: Hiroyuki Uchida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 18/365,563

(22) Filed: Aug. 4, 2023

(65) Prior Publication Data
US 2024/0054278 A1   Feb. 15, 2024

(30) Foreign Application Priority Data
Aug. 10, 2022   (JP) .................................. 2022-128259

(51) Int. Cl.
*G06F 40/14*   (2020.01)
(52) U.S. Cl.
CPC .................................... *G06F 40/14* (2020.01)

(58) Field of Classification Search
None
See application file for complete search history.

(56) References Cited

U.S. PATENT DOCUMENTS

| | | | |
|---|---|---|---|
| 9,178,956 B2 * | 11/2015 | Schneider | G06Q 30/02 |
| 2002/0055912 A1 * | 5/2002 | Buck | G06Q 30/02 705/76 |
| 2006/0075122 A1 * | 4/2006 | Lindskog | H04L 63/0823 709/228 |

FOREIGN PATENT DOCUMENTS

JP   2004-094506   3/2004

* cited by examiner

*Primary Examiner* — Tuan S Nguyen
(74) *Attorney, Agent, or Firm* — Venable LLP

(57) ABSTRACT

In a case where a third web page corresponding to a second domain is displayed based on an operation in a second web page, control is performed based on a referrer in the third web page such that the inquiry area is not displayed, even without receipt of a first operation or a second operation indicating rejection of use of the cookie in the inquiry area displayed together with the second web page.

20 Claims, 8 Drawing Sheets

INFORMATION DISPLAY CONTROL APPARATUS, INFORMATION DISPLAY CONTROL METHOD, AND COMPUTER READABLE STORAGE MEDIUM

BACKGROUND OF THE INVENTION

Field of the Invention

This disclosure relates to an information display control apparatus, information display control method, and information display control program for controlling display of an inquiry area concerning information collection.

Description of the Related Art

In order to display information suitable for a user on a web page or analyze a web access status, information such as web page transition information and browsing time of a user is generally collected by the use of a cookie, which corresponds to information related to personal information under the Act on the Protection of Personal Information. In recent years, with the tightening of the regulations for collection of information related to personal information under the Act on the Protection of Personal Information, it has been required that acceptance of collection of information related to personal information be received from a user. Thus, many web pages display a screen to receive acceptance of information collection from a user, the screen including a message that calls attention to information collection and an accept button/reject button (the screen is hereinafter simply referred to as "inquiry area"). The inquiry area is kept displayed at the top of a web page. Alternatively, after a web page is entirely made inoperable, the inquiry area is displayed at the center to overlap the web page. The display of the inquiry area is continued unless a user indicates the user's intention to accept or reject by operating the button. In addition, the inquiry area is displayed each time a web page is opened. As a result, a content display area of the web page is narrowed, or the entire web page remains inoperable. These operations decrease a user's convenience in web page browsing.

Japanese Patent Laid-Open No. 2004-94506 (hereinafter referred to as Literature 1) discloses a technique of displaying on a screen a pair of a button and a message that provides a user with information, hiding the screen at the press of the button, and automatically redisplaying the screen as necessary.

However, the message notified in Literature 1 is information provided to a user per se and is not for notifying the possibility/impossibility of acceptance of a predetermined matter as the premise of information provision. There is a need to improve a user's convenience in web page browsing.

SUMMARY OF THE INVENTION

An embodiment of this disclosure is a control method for an information processing apparatus, the control method comprising:

a first control step in which in a case where a second web page corresponding to a second domain different from a first domain is displayed based on an operation in a first web page corresponding to the first domain, control is performed such that an inquiry area for receiving from a user a first operation indicating acceptance of use of a cookie is displayed together with the second web page; and a second control step in which in a case where a third web page corresponding to the second domain is displayed based on an operation in the second web page, control is performed based on a referrer in the third web page such that the inquiry area is not displayed even without receipt of either the first operation or a second operation indicating rejection of use of the cookie in the inquiry area displayed together with the second web page, wherein on the basis that the first operation is received in the inquiry area, a process using the cookie is enabled in a web page corresponding to the second domain.

Further features of the present invention will become apparent from the following description of exemplary embodiments with reference to the attached drawings.

DESCRIPTION OF THE EMBODIMENTS

Preferred embodiments of this disclosure will be described below in detail with reference to the accompanying drawings. It should be noted that the following embodiments do not limit the claimed invention and not all combinations of features described in the embodiments are necessarily essential for solving the problem of this disclosure.

Figure 1:
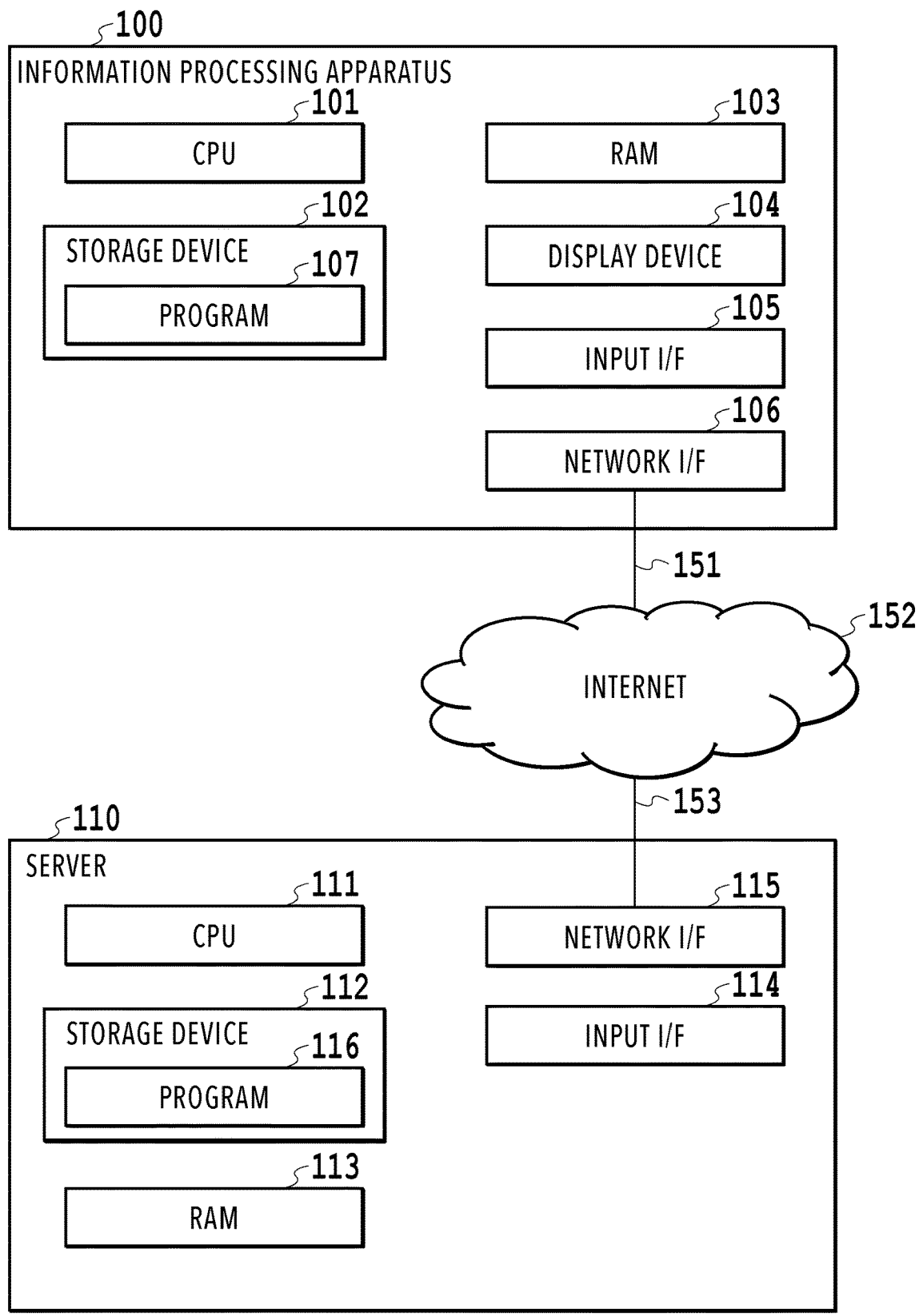
FIG. 1 is a system configuration diagram.

FIG. 1 is a system configuration diagram including an information processing apparatus 100 and a server 110. The information processing apparatus 100 comprises a CPU 101, a storage device 102, a RAM 103, a display device 104, an input interface (UF) 105, and a network I/F 106. The storage device 102 is a hard disk drive or the like and stores a program 107 such as a web browser. The information processing apparatus 100 is connected to the Internet 152 via a network connection 151 by an Ethernet cable or Wi-Fi. The server 110 is connected to the Internet 152 via a network connection 153. The information processing apparatus 100 and the server 110 can communicate with each other on the Internet 152.

The server 110 comprises a CPU 111, a storage device 112, a RAM 113, an input I/F 114, and a network I/F 115. The storage device 112 is a hard disk drive or the like and stores an information display control program and a program 116 such as an information display control program distribution process.

First Embodiment

Figure 2:
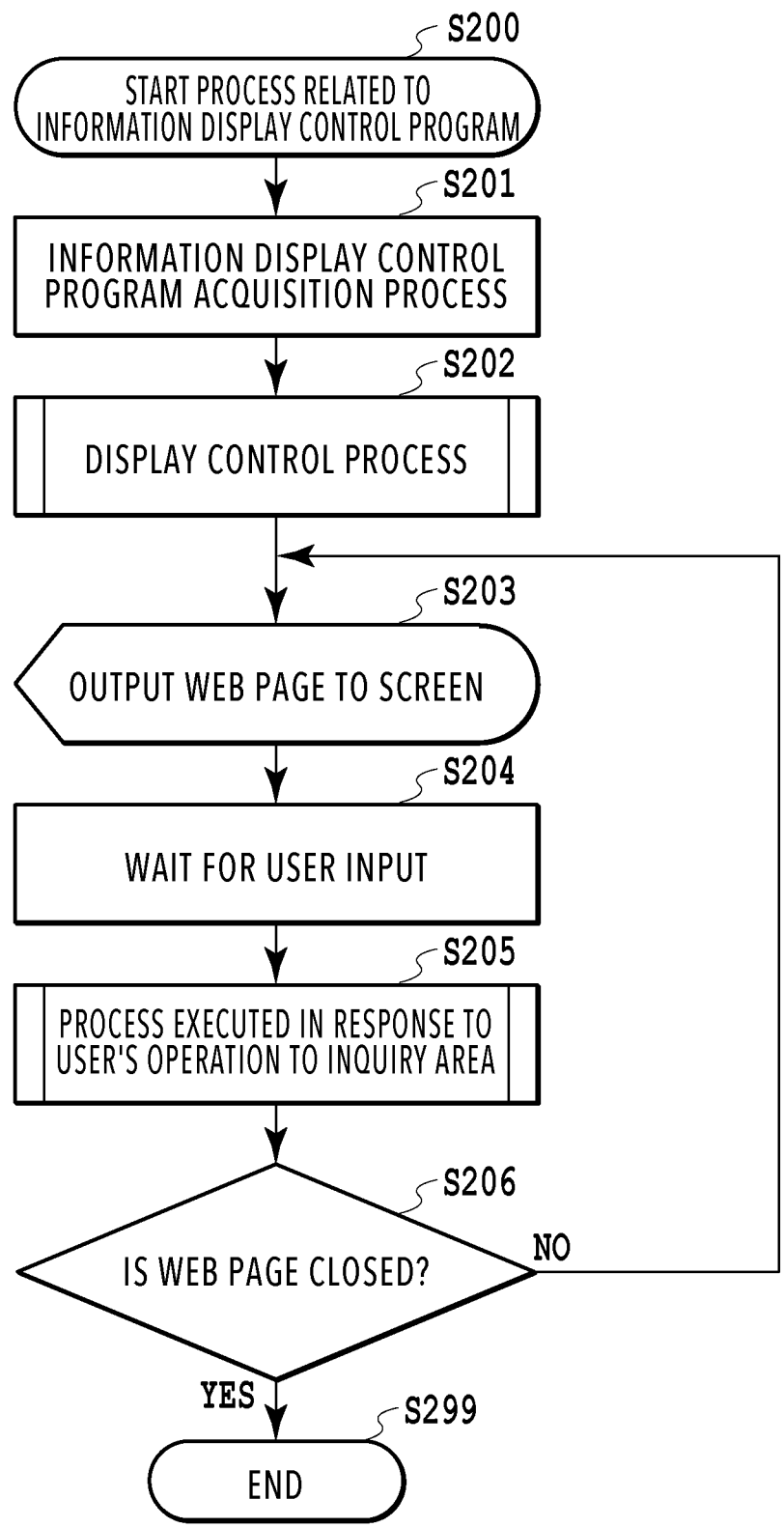
FIG. 2 is a flowchart showing an information display control program process.
Figure 3:
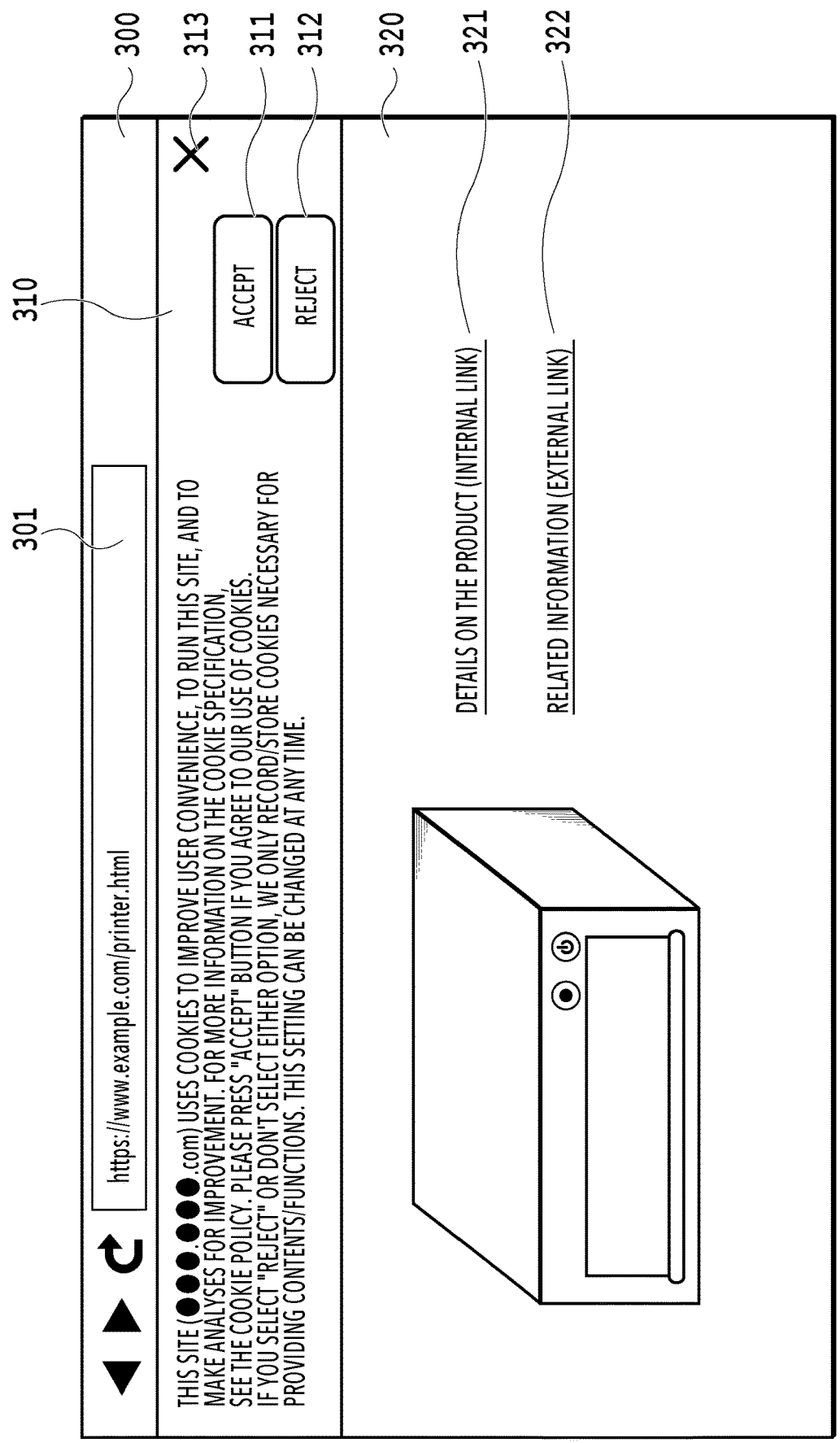
FIG. 3 is a web page display screen.
Figure 4:
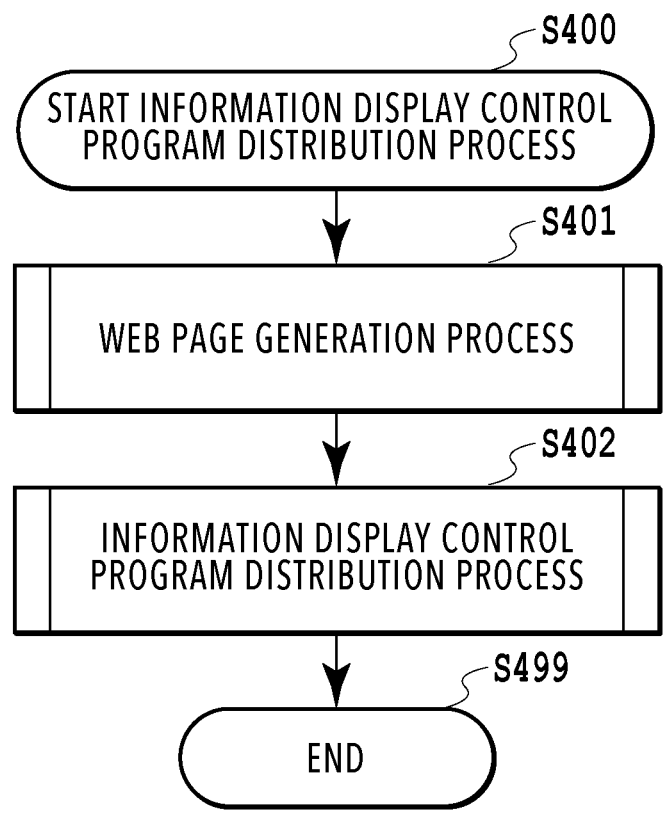
FIG. 4 is a flowchart showing an information display control program distribution process.

FIG. 2 is a flowchart showing an entire process related to the information display control program by the information processing apparatus 100 (hereinafter referred to as "information display control program process"). FIG. 3 shows a screen displayed by the information display control program. FIG. 4 is a flowchart showing a process, executed by the server 110, for distributing the information display control program. Incidentally, the information display control program stated here is concretely a script program such as JavaScript described in a web page. The storage device 102 stores a program code of a web browser and functions as an interpreter for the web browser to execute the script. The information display control program process in FIG. 2 is executed by the CPU 101 of the information processing apparatus 100 loading the program code of the web browser stored in the storage device 102 into the RAM 103 and executing the program code. This execution also includes the execution of the script by the web browser. Incidentally, the sign "S" in the explanation of each process means a step in the flowchart (the same applies hereinafter). The process in the flowchart of FIG. 2 is executed each time an operation is performed to display any web page of an owner's site. This operation is, for example, an operation to transition from a web page search site and display the owner's site for the first time. The operation may be an operation to input a URL of the owner's site to a URL input section of the browser and display the owner's site. Further, the operation may be an operation to transition from any web page of the owner's site and display another web page of the owner's site. For example, the operation to transition from any web page of the owner's site and display another web page of the owner's site corresponds to an operation of a hyperlink 321 or a hyperlink 322, which will be described later. Incidentally, in the present embodiment, the owner's site indicates a site provided by a vendor providing the information display control program and displayed by a predetermined domain acquired by the vendor.

The process and screen of the information display control program will be described with reference to FIG. 2, FIG. 3, and FIG. 4. According to a user's operation of the input I/F 105, the information processing apparatus 100 downloads a web page including the information display control program from the server 110 running a predetermined web site and displays the web page on the display device 104.

According to FIG. 2, in S200, the CPU 101 of the information processing apparatus 100 starts a process related to the information display control program. Next, in S201, the CPU 101 acquires the information display control program using the program 107 such as a web browser. The program 107 secures a storage area in the storage device 102 or the RAM 103. The program 107 can store in this storage area a referrer, a session flag, an information collection accepted flag, an expiration date of the information collection accepted flag, an inquiry area display flag, and a time of press of a hide button 313. An initial value of each piece of information (referrer, each flag, expiration date, time of press) is a null value. The program 107 continues storing the information collection accepted flag, the expiration date, and the time of press of the hide button 313 even after the program 107 is ended. Here, the referrer indicates a URL of a web page that was displayed by the program 107 before the web page that is currently displayed. The session flag is set at the time of start of a session of a predetermined site (in the present embodiment, the site provided by the server 110, namely the owner's site) as will be described later. The session flag is reset at the time of closing of the web browser. However, the reset timing is not limited to this; the session flag may be reset after a predetermined time has passed from the setting of the flag. Further, the session flag may be reset in a predetermined condition by a program 107. A specific value of the expiration date will be described later. In S201, the CPU 101 requests the server 110 to distribute a web page including the information display control program. The web page including the information display control program includes a screen as shown in FIG. 3 (web page), a button included in this screen, and the information display control program.

The screen shown in FIG. 3 includes an inquiry area 310 under the control of the information display control program, but it may not include the area in some cases. The inquiry area 310 shows an inquiry area. For example, as shown in FIG. 3, the inquiry area 310 includes the following inquiry text: "This site (www.example.com) uses cookies to improve user convenience, to run this site, and to make analyses for improvement. For more information on the cookie specification, see the cookie policy. Please press 'accept' button if you agree to our use of cookies. If you select 'reject' or don't select either option, we only record/store cookies necessary for providing contents/functions. This setting can be changed at any time."

The inquiry area 310 also has an accept button 311, a reject button 312, and a hide button 313. In this disclosure, a section including the accept button 311, the reject button 312, and the hide button 313 is referred to as an operation section of the inquiry area 310.

Further, according to FIG. 3, a header display screen 300 has an address bar 301 to display a URL corresponding to a web page. Further, a content display screen 320 displays a content. In the example of FIG. 3, the content includes a perspective view of equipment and two hyperlinks 321 and 322. The first hyperlink 321 is a hyperlink to another web page in the owner's domain or the like and the second hyperlink 322 is a hyperlink to a web page in another domain or the like.

According to FIG. 4, in response to the information display control program acquisition process in S201, the CPU 111 of the server 110 starts the information display control program distribution process in S400. The information display control program distribution process in FIG. 4 is executed by the CPU 111 of the server 110 loading a program code for a server stored in the storage device 112 into the RAM 113 and executing the program code. In S401, the CPU 111 generates a web page in response to the request from the information processing apparatus 100. As stated above, this web page includes the information display control program in addition to various contents. After that, in S402, the CPU 111 executes the information display control program distribution process and transmits content data including the information display control program to the information processing apparatus 100 in response to the request from the information processing apparatus 100. After that, in S499, the CPU 111 finishes the information display control program distribution process.

Returning to FIG. 2, in response to the information display control program distribution process S402, the CPU 101 of the information processing apparatus 100 executes in S202 the information display control program included in the distributed web page and thereby starts a display control process.

Figure 5:
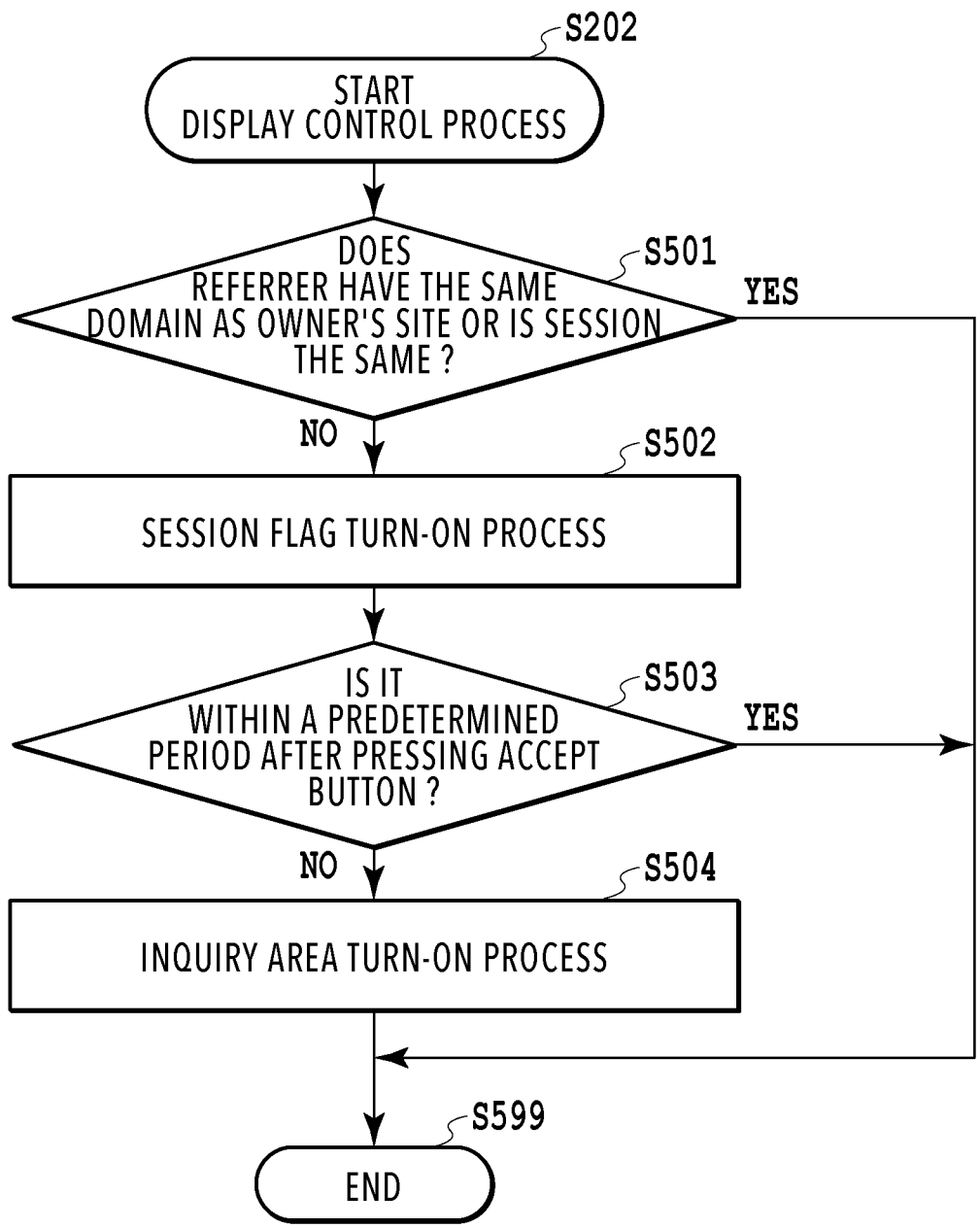
FIG. 5 is a flowchart showing a display control process of an information display control program according to a first embodiment.

FIG. 5 is a flowchart showing the details of a display control process S202. If the display control process is started by the execution of the information display control program, the CPU 101 of the information processing apparatus 100 first executes S501. The CPU 101 determines in S501 whether at least one of the following is satisfied: a referrer includes the domain of the owner's site, and a session flag is on (set). The referrer and session flag are stored in the storage area that the program 107 secures in the storage device 102 or RAM 103. Further, for example, in a case where the URL of the web page is "https://www.example.com/printer.html," the domain indicates the portion "www.example.com," namely the portion sandwiched between "https://" indicating the protocol and "/" immediately following that. In the present embodiment, the domain indicates a domain of the server 110, but is not limited to this example.

If the CPU 101 of the information processing apparatus 100 determines that the answer is YES in S501, the CPU 101 bypasses the process from S502 to S504 and finishes the display control process in S599. In this case, the session flag is kept at the current value. The inquiry area display flag is also kept at the current value. A specific example in which the answer is determined to be YES in S501 is described below. In a case where the referrer includes the domain of the owner's site, such as a case where another web page in the owner's domain is to be displayed at the press of the first hyperlink 321 in the example of FIG. 3, it is determined that the answer is YES in S501. Here, it is assumed that a user then temporarily gets away from the owner's domain and views a web page of another domain. In this state, in a case where the web page of the owner's domain is displayed again, it is determined that the answer is YES in S501. In this case, although the referrer is the domain of the other site, it is determined in S501 that the answer is YES because the session flag is on. In this manner, it is determined that the answer is YES in S501 also in a case where the web page to be currently displayed is a web page displayed for the second time or more in the session.

On the other hand, if the CPU 101 of the information processing apparatus 100 determines that the answer is NO in S501, the CPU 101 advances the process to S502. In S502, the CPU 101 turns on the session flag. Here, the CPU 101 determines that the answer is NO in S501 in a case where the referrer includes a domain other than the domain of the owner's site and the session flag is off. To be more specific, this case is a case where there is currently no session that continues from the past and a transition is made from the other domain to the domain of the owner's site, and more specifically, a case where the web page to be currently displayed is a web page to be displayed for the first time in the session of the owner's site. In this case, the session flag is turned on as stated above, whereby the session of the owner's site is started.

After the execution of S502, the CPU 101 advances the process to S503. The CPU 101 determines in S503 whether the expiration date has passed since the information collection accepted flag stored in the storage area that the program 107 secures in the storage device 102 or RAM 103 was turned on. Here, if the accept button was pressed by a user in the last or earlier session and the expiration date (predetermined time) has not passed since then, the answer is determined to be YES in S503. That is, the case where it is determined that the answer is YES in S503 corresponds to, for example, a case where the following (1) to (3) are continuously executed: (1) the accept button is pressed in a web page of the owner's site displayed by the program 107; (2) after that, the browser is ended; (3) after that, before the elapse of the predetermined time, the browser is started again and the web page of the owner's site is accessed again in a new session. Incidentally, a case where it is determined that the answer is NO in S503 corresponds to, for example, a case where a web page of the owner's site has never been displayed by the program 107. Further, the case where it is determined that the answer is NO in S503 corresponds to, for example, a case where the following (1) and (2) are continuously executed: (1) after the accept button is pressed in a web page of the owner's site displayed by the program 107, the browser is ended; (2) after the elapse of the predetermined time, the browser is started again and the web page of the owner's site is accessed again in a new session. Incidentally, the determination in S503 may be determination of whether the accept button is pressed by a user and the information collection accepted flag is turned on. That is, irrespective of the expiration date, the process may bypass S504 and proceed to S599 if the information collection accepted flag is on.

If the answer is determined to be YES in S503, the CPU 101 bypasses the process in S504 and finishes the display control process in S599. In this case, the session flag has been turned on since S502. On the other hand, if the answer is determined to be NO in S503, the CPU 101 advances the process to S504. In S504, the CPU 101 turns on the inquiry area display flag. In this case, the session flag has been turned on since S502. After the execution of S504, the CPU 101 finishes the display control process in S599.

That is, if the accept button was pressed in the last or earlier session and the expiration date has not passed since then, the press of the accept button is treated as valid. In this case, since the display of the inquiry area is unnecessary, the answer is determined to be YES in S503 and the process bypasses S504 and advances to S599. In other cases, it is basically necessary to display the inquiry area 310 and receive a reply. Thus, the answer is determined to be NO in S503, and the inquiry area display flag is turned on in S504.

Returning to FIG. 2, if the CPU 101 finishes the display control process 202, the CPU 101 causes the display device 104 to display the distributed web page. Here, if the inquiry area display flag is on, the CPU 101 displays the inquiry area 310 in addition to the header display screen 300 and the content display screen 320. Alternatively, if the inquiry area display flag is on, the CPU 101 displays the inquiry area 310 before displaying the header display screen 300 and the content display screen 320. On the other hand, if the inquiry area display flag is off, the CPU 101 only displays the header display screen 300 and the content display screen 320 without displaying the inquiry area 310. Incidentally, an inquiry web page (not shown) displaying the same area as the inquiry area 310 may be provided in the owner's domain and an inquiry hyperlink (not shown) for displaying the inquiry web page may be displayed in the owner's site. Even while the above control is performed such that the inquiry area 310 is not displayed, the inquiry web page is displayed if the inquiry hyperlink is operated. Accordingly, in a case where a user wants to provide an input to the inquiry after the control is performed such that the inquiry area 310 is not displayed, the input to the inquiry can be provided by displaying the inquiry web page. Incidentally, the behavior exhibited in a case where the accept button or reject button is operated in the inquiry web page is the same as the behavior exhibited in a case where the accept button 311 or reject button 312 is operated in the inquiry area 310.

Returning to FIG. 2, if a user presses any of the accept button 311, the reject button 312, and the hide button 313 using the input I/F 105 in the inquiry area 310, the CPU 101 waiting for the user input in S204 executes S205. S205 is basically a process executed in response to a user's operation of the inquiry area 310. Incidentally, in a case where the inquiry area 310 is not displayed, it is determined in S205 that the answer is NO in S601, NO in S602, and NO in the answer in S603, and S205 is substantially omitted. Accordingly, in a case where the inquiry area 310 is not displayed, the loop from S203 to S206 is repeated until the answer is determined to be YES in S206. Although not illustrated as being not directly related to this disclosure, a process executed in a case where an input is provided to the content display screen 320 may be inserted between S205 and S206.

Figure 6:
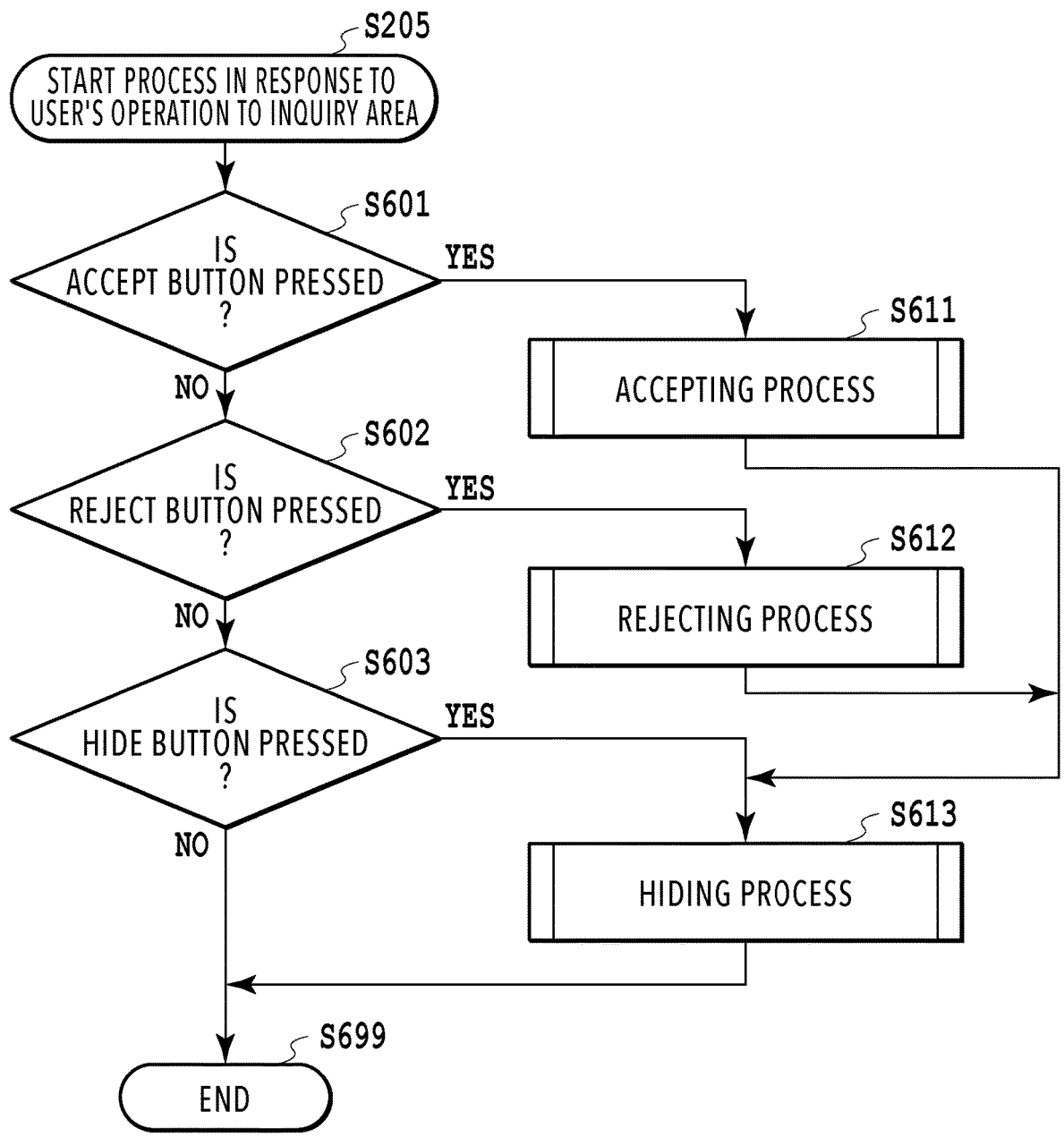
FIG. 6 is a flowchart showing a process by the information display control program in a case where a user operates an inquiry area.

According to FIG. 6 showing the details of S205, if the CPU 101 determines in S204 that the accept button 311 is pressed (YES in S601), the CPU 101 first turns on the information collection accepted flag in S611. The CPU 101 also executes a process for enabling information collection. Further, for example, the CPU 101 sets a time 30 days after the current time as an expiration date. After that, the CPU 101 hides the inquiry area and turns off the inquiry area display flag in the hiding process in S613, and it finishes the process of S205 in S699.

If the CPU 101 determines in S204 that the reject button 312 is pressed (NO in S601, YES in S602), the CPU 101 turns off the information collection accepted flag in S612. The CPU 101 also executes a process for disabling information collection. Further, for example, the CPU 101 sets a time 30 days after the current time as an expiration date. After that, the CPU 101 hides the inquiry area and turns off the inquiry area display flag in the hiding process in S613, and it finishes the process of S205 in S699.

If the CPU 101 determines in S204 that the hide button 313 is pressed (NO in S601, NO in S602, YES in S603), the CPU 101 hides the inquiry area in the hiding process in S613. Following that, the CPU 101 turns off the inquiry area display flag and finishes the process of S205 in S699. In this case, the information collection accepted flag is not changed and the expiration date is not set.

If the CPU 101 determines in S204 that none of the accept button 311, the reject button 312, and the hide button 313 is pressed (NO in S601, S602, and S603), the CPU 101 finishes the process of S205 in S699 without performing anything. In this case, neither the inquiry area display flag nor the information collection accepted flag is changed.

If the information collection accepted flag is turned on in S611, the information display control program is allowed to store various kinds of information input or displayed in the browser as arbitrary information in the storage area secured by the program 107. Incidentally, in the present embodiment, the owner's site stated above shows information about printing apparatuses provided by the vendor providing the information display control program. Further, the owner's site can receive from a user an input of the type or model of a printing apparatus that the user uses. Based on the type or model specified by the received input, a manual of the printing apparatus or an operation for an initial setup of the printing apparatus can be displayed. Accordingly, in the present embodiment, if the information collection accepted flag is turned on, the information display control program stores the type or model of the printing apparatus that the user uses as arbitrary information based on the input. This saves the necessity of receiving an input of the type or model of the printing apparatus again in a case where the manual of the printing apparatus or the operation for an initial setup of the printing apparatus is displayed again. On the other hand, if the information collection accepted flag is turned off, the information display control program cannot store the type or model of the printing apparatus that the user uses. Accordingly, if the information collection accepted flag is turned off, the user should perform the following burdensome operation: the user is required to input the type or model of the printing apparatus that the user uses each time the manual of the printing apparatus or the operation for an initial setup of the printing apparatus is displayed. Incidentally, information stored as arbitrary information in a case where the information collection accepted flag is turned on is not limited to the above information and any information may be collected. Further, a process executed based on information stored as arbitrary information in a case where the information collection accepted flag is turned on is not limited to the above display process and may be any process.

If the CPU 101 does not detect in S206 that a user performs an operation to close the screen shown in FIG. 3 (NO), the CPU 101 repeats the process from S203 to S205. If the CPU 101 detects in S206 that a user performs an operation to close the screen shown in FIG. 3 (YES), the CPU 101 finishes the process in S299.

The flow of the process is roughly as stated above. Each aspect in the processes according to the above flowcharts will be described below. More specifically, a description will be first given of an example in which the hyperlink 321 is pressed while the web screen is displayed, followed by a description of an example in which the hyperlink 322 is pressed while the web screen is displayed.

If the CPU 101 detects in S204 that a user presses the hyperlink 321 to another content in the owner's domain using the input I/F 105, the CPU 101 executes the process executed in response to a user's operation of the inquiry area (S205). In this case, since the CPU 101 determines in S204 that none of the accept button 311, the reject button 312, and the hide button 313 is pressed (NO in S601, S602, and S603), the CPU 101 finishes the process of S205 in S699 without performing anything. In this case, neither the inquiry area display flag nor the information collection accepted flag is changed. Next, since the press of the hyperlink 321 is also an operation to close the current screen and open a new screen, the CPU 101 determines in S206 that the answer is YES and finishes the process in S299.

After that, the program 107 executed by the CPU 101 displays a web page specified by the hyperlink 321 in the owner's domain as stated below. That is, the CPU 101 starts in S200 the process of the information display control program included in the web page specified by the hyperlink 321 in the owner's domain, and it executes in S201 a display control program acquisition process. In S201, the CPU 201 requests the server 110 to distribute the web page specified by the hyperlink 321 in the owner's domain. This web page includes the information display control program. In response to the request for distribution, the CPU 111 of the server 110 starts in S400 the information display control program distribution process and generates in S401 the web page to be distributed. The CPU 111 then distributes the web page in the information display control program distribution process in S402. After that, the CPU 111 finishes the information display control program distribution process in S499.

Next, in response to the information display control program distribution process (S402), the CPU 101 of the information processing apparatus 100 executes in S202 a display control process based on the information display control program included in the distributed web page. If the CPU 101 starts the display control process, the CPU 101 executes a determination process in S501. Since the referrer includes the same domain name as the domain name of the owner's site, the CPU 101 determines in S501 that the answer is YES, bypasses S502 to S504, and finishes the display control process in S599.

That is, in the display control process S202 of the web page downloaded from the server 110 as a web page to be displayed for the second time since the start of the session, neither the session flag nor the inquiry area display flag is changed. The session flag has been already turned on. The inquiry area display flag keeps an on or off value that the flag had at the time of closing of the web page displayed for the first time since the start of the session. Although not directly related to S202, the information collection accepted flag also keeps an on, off, or null value that the flag had at the time of closing of the web page displayed for the first time since the start of the session.

Next, in S203, the CPU 101 causes the display device 104 to display the web page distributed in S201. If the inquiry area display flag was on at the time of closing of the web page displayed for the first time since the start of the session, the web page currently displayed in S203 includes the inquiry area 310. In contrast, if the inquiry area display flag was off at the time of closing of the web page displayed for the first time since the start of the session, the web page currently displayed in S203 does not include the inquiry area 310. Here, in a case where the accept button 311 or the reject button 312 was pressed in the web page displayed for the first time since the start of the session, the hiding process (S613) has been executed. Accordingly, in this case, the web page currently displayed in S203 does not include the inquiry area 310. Further, the hiding process (S613) has been executed also in a case where the hide button 313 was pressed in the web page displayed for the first time since the start of the session. Thus, also in this case, the web page currently displayed in S203 does not include the inquiry area 310. Accordingly, the web page currently displayed in S203 does not include the inquiry area 310 also in a case where a user pressed the hide button 313 in the web page displayed for the first time, in addition to the case where a user pressed the accept button 311 or the reject button 312.

Next, if the CPU 101 detects in S204 that a user presses the hyperlink 322 to a content in a domain other than the owner's domain using the input I/F 105, the CPU 101 executes the process executed in response to a user's operation of the inquiry area 310 (S205). In this case, since the CPU 101 determines in S204 that none of the accept button 311, the reject button 312, and the hide button 313 was pressed (NO in S601, S602, and S603), the CPU 101 finishes the process of S205 in S699 without performing anything. In this case, neither the inquiry area display flag nor the information collection accepted flag is changed. Next, since the press of the hyperlink 322 is also an operation to close the screen and then open a new screen, the CPU 101 determines in S206 that the answer is YES and finishes the process in S299.

After that, the program 107 downloads and displays the web page in the domain other than the owner's domain (hereinafter referred to as "external web page"). If a user presses a hyperlink in the external web page to a web page in the domain of the owner's site (hereinafter referred to as "regression hyperlink"), the program 107 executed by the CPU 101 displays the web page specified by the regression hyperlink as follows. That is, the CPU 101 starts in S200 the process of the information display control program included in the web page specified by the regression hyperlink, and it the display control program acquisition process in S201. In S201, the CPU 201 requests the server 110 to distribute the web page specified by the regression hyperlink in the owner's domain. This web page includes the information display control program. In response to the request for distribution, the CPU 111 of the server 110 starts in S400 the information display control program distribution process and executes in S401 the display content generation process for the web page to be distributed. The CPU 111 then distributes the web page in the information display control program distribution process in S402. After that, the CPU 111 finishes the information display control program distribution process in S499.

Next, in response to the information display control program distribution process (S402), the CPU 101 of the information processing apparatus 100 executes in S202 the display control process based on the information display control program included in the distributed web page. If the CPU 101 starts the display control process, the CPU 101 executes a determination process in S501. Here, the referrer does not include the same domain name as the domain name of the owner's site. However, the session flag remains turned on as long as the expiration date of the session flag is set and has not yet passed. Thus, the CPU 101 determines in S501 that the answer is YES, bypasses S502 to S504, and finishes the display control process in S599.

That is, the session flag is basically on in the display control process S202 for the web page downloaded from the server 110 as a web page to be displayed for the second time in the current session by way of the web page of the external domain. Thus, the CPU 101 determines in S501 that the answer is YES. Since neither S502 nor S504 is executed, no change is made to the session flag or the inquiry area display flag. The inquiry area display flag keeps an on or off value that the flag had at the time of closing of the web page displayed for the first time since the start of the session. Although not directly related to S202, the information collection accepted flag also keeps an on, off, or null value that the flag had at the time of closing of the web page displayed for the first time since the start of the session.

If the expiration date of the session flag is set and has passed, it is determined in S501 that the answer is NO, and a new session is started.

Next, in S203, the CPU 101 causes the display device 104 to display the web page distributed in S201. If the inquiry area display flag was on at the time of closing of the web page displayed for the first time since the start of the session, the web page currently displayed in S203 includes the inquiry area 310. In contrast, if the inquiry area display flag was off at the time of closing of the web page displayed for the first time since the start of the session, the web page currently displayed in S203 does not include the inquiry area 310. Here, in a case where the accept button 311 or the reject button 312 was pressed in the web page displayed for the first time since the start of the session, the hiding process (S613) has been executed. Accordingly, in this case, the web page currently displayed in S203 does not include the inquiry area 310. Further, the hiding process (S613) has been executed also in a case where the hide button 313 was pressed in the web page displayed for the first time since the start of the session. Thus, also in this case, the web page currently displayed in S203 does not include the inquiry area 310. Accordingly, the web page currently displayed in S203 does not include the inquiry area 310 also in a case where a user pressed the hide button 313 in the web page displayed for the first time, in addition to the case where a user pressed the accept button 311 or the reject button 312.

If the hyperlink 321 was pressed before the press of any of the accept button 311, the reject button 312, and the hide button 313 in the web page displayed for the first time since the start of the session, the web page currently displayed in S203 includes the inquiry area 310. The web page currently displayed in S203 includes the inquiry area 310 also in a case where the hyperlink 322 was pressed before the press of any of the accept button 311, the reject button 312, and the hide button 313 in the web page displayed immediately after the start of the session.

The above series of processes is also applied to the web page of the owner's domain displayed for the third time or more. That is, the currently-displayed web page of the owner's domain can also be displayed in the same manner based on a history of a flag operation in the web page of the owner's domain displayed before the currently-displayed web page of the owner's domain. If a user pressed any of the accept button, the reject button, or the hide button in any web page of the owner's domain displayed before the currently-displayed web page of the owner's domain, the currently-displayed web page of the owner's domain does not include the inquiry area 310.

As described above, according to the present embodiment, the inquiry area 310 is not displayed on the screen even in a case where a user presses the hide button while suspending an indication of the user's intention to accept or reject. This can avoid a user's displeasure caused by the display of the inquiry area 310, and further prevent a user from stopping viewing the web page due to such displeasure.

Operation Example 1: A Case where a New Session is Started Before the Expiration Date Set at the Press of the Accept Button in the Last Session.

At the time of press of the accept button in the last session, the information collection accepted flag was turned on and the expiration date was set. If a new session is started, S503 is executed by way of NO in S501 and S502. In S503, the answer is YES. Thus, S504 is bypassed. In S203 executed after that, the web page with no inquiry area is displayed.

Operation Example 2: A Case where a New Session is Started after the Expiration Date Set at the Press of the Accept Button in the Last Session.

If a new session is started, S503 is executed by way of NO in S501 and S502. In S503, the answer is NO. Thus, S504 is executed, and the inquiry area display flag is turned on. In S203 executed after that, the web page including the inquiry area is displayed.

Operation Example 3: A Case where the Accept Button is Pressed in the Web Page First Displayed in the New Session in Operation Example 2.

If the accept button is pressed, the accepting process is executed in S611, and the inquiry area display flag is then reset to off in the hiding process in S613. After that, the process returns to S203, where the same web page including no inquiry area is displayed again.

Operation Example 4: A Case where the Reject Button is Pressed in the Web Page First Displayed in the New Session in Operation Example 2.

If the reject button is pressed, the rejection process is executed in S612, and the inquiry area display flag is then reset to off in the hiding process in S613. After that, the process returns to S203, where the same web page including no inquiry area is displayed again.

Operation Example 5: A Case where the Hide Button is Pressed in the Web Page First Displayed in the New Session in Operation Example 2.

If the hide button is pressed, the inquiry area display flag is reset to off in the hiding process in S613. After that, the process returns to S203, where the same web page including no inquiry area is displayed again.

Operation Example 6: A Case where an Internal Link is Pressed Before the Operation of the Operation Section in the Web Page First Displayed in the New Session in Operation Example 2.

The first web page is closed before the execution of S613. Accordingly, the inquiry area display flag is kept turned on. In the process for the next web page, S504 is bypassed because the answer is determined to be YES in S501 based on the referrer, while the inquiry area display flag is on. Thus, the web page including the inquiry area is displayed in S203.

Operation Example 7: A Case where an External Link is Pressed Before the Operation of the Operation Section in the Web Page First Displayed in the New Session in Operation Example 2, and after that, a Web Page of the Owner's Domain is Displayed.

The first web page is closed before the execution of S613. Accordingly, the inquiry area display flag is kept turned on. In the process for the next web page, S504 is bypassed because the answer is determined to be YES in S501 based on the session flag, while the inquiry area display flag is on. Thus, the web page including the inquiry area is displayed in S203.

Operation Example 8: A Case where an Internal Link is Pressed after the Operation of the Operation Section in the New Session in the Web Page First Displayed in Operation Example 2.

The first web page is closed after the execution of S613. Accordingly, the inquiry area display flag is kept turned off. In the process for the next web page, S504 is bypassed because the answer is determined to be YES in S501 based on the referrer, while the inquiry display flag is off. Thus, the web page including no inquiry area is displayed in S203.

Operation Example 9: A Case where an External Link is Pressed after the Operation of the Operation Section in the Web Page First Displayed in the New Session in Operation Example 2, and after that, a Web Page of the Owner's Domain is Displayed.

The first web page is closed after the execution of S613. Accordingly, the inquiry area display flag is kept turned off. In the process for the next web page, S504 is bypassed because the answer is determined to be YES in S501 based on the session flag, while the inquiry display flag is off. Thus, the web page including no inquiry area is displayed in S203.

Second Embodiment

The present embodiment is for basically exempting the inquiry area from being displayed in a case where a user suspends a decision whether to accept collection of information related to personal information and the user does not inhabit in a region where regulations for collection of information related to personal information are strict.

Figure 7:
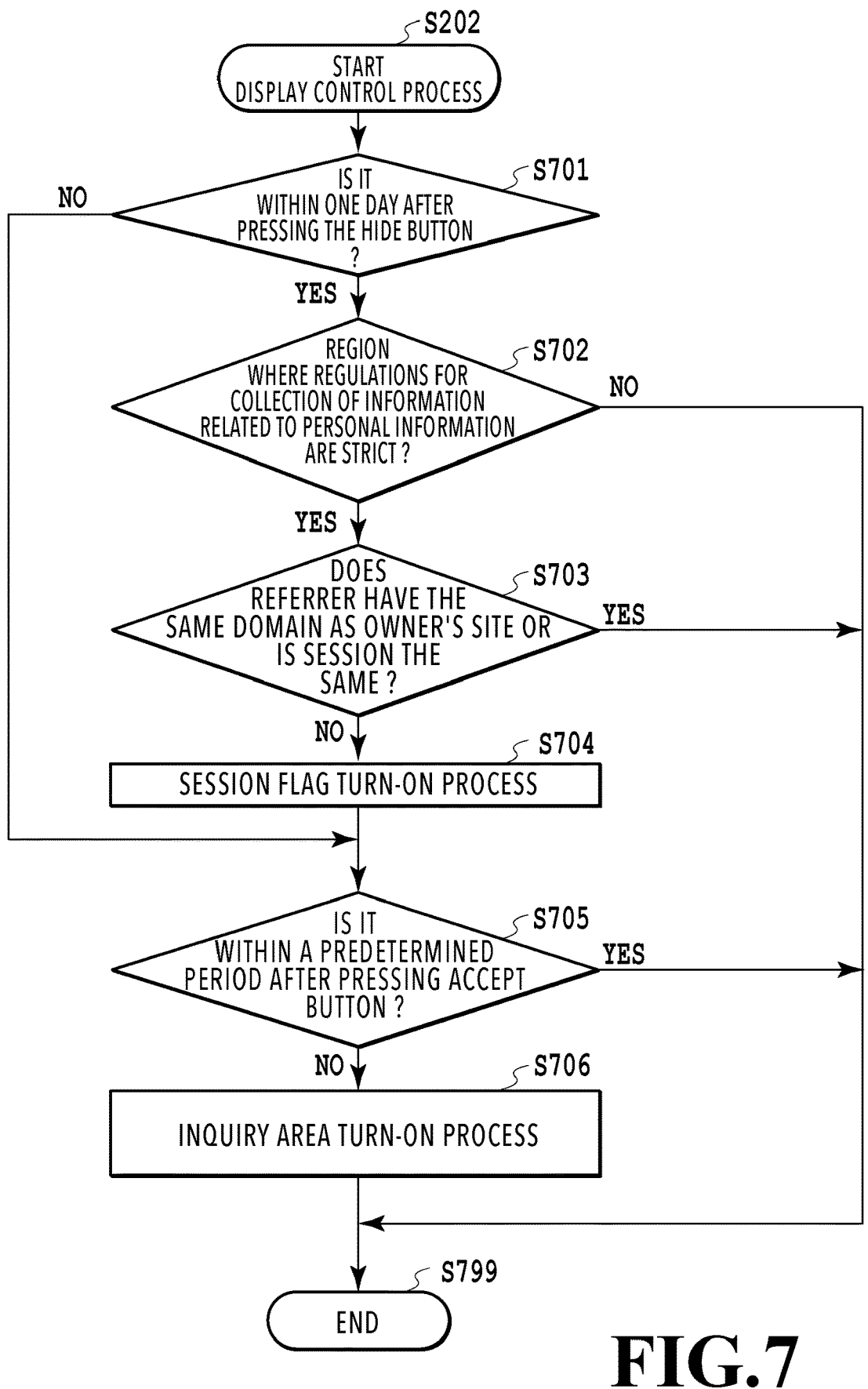
FIG. 7 is a flowchart showing an information display control process of an information display control program according to a second embodiment.

FIG. 7 is a flowchart showing the details of the display control process (S202) according to the present embodiment. If the CPU 101 of the information processing apparatus 100 starts the display control process of the information display control program, the CPU 101 determines in S701 whether a time that has passed from the date and time of press of the hide button 313 to the present time is within one day, for example. The date and time of press of the hide button 313 is stored in the storage area provided by the program 107 in the storage device 102 or RAM 103.

If the answer is NO in the determination process S701, the CPU 101 advances the process to S705. The CPU 101 determines in S705 whether a period from the press of the accept button to the present time is within a predetermined period. If the period from the press of the accept button to the present time is within the predetermined period, the CPU 101 bypasses S706 and finishes the process of S202 in S799. In contrast, if the period from the press of the accept button to the present time is not within the predetermined period, the CPU 101 turns on the inquiry area display flag in S706 and then finishes the process of S202 in S799.

On the other hand, if the answer is YES in the determination process S701, the CPU 101 advances the process to S702 and determines whether an access source region of a user is a region where regulations for collection of information related to personal information are strict. Here, information associating a region with the strictness of regulations for collection of information related to personal information is included in the information display control program. A region indicates, for example, the U.S.A., Japan, Mainland China, EU, or the like. A country and region can be identified from an IP address that the information processing apparatus 100 uses to access the server 110. If the access source region of the user is not a region where regulations for collection of information related to personal information are strict, the CPU 101 determines that the answer is NO in the determination process S702, advances the process to S799, and finishes the display control process. In contrast, if the access source region of the user is a region where regulations for collection of information related to personal information are strict, the CPU 101 determines that the answer is YES in the determination process S702 and advances the process to S703.

Since the processes in S703, S704, S705, and S706 are the same as those in S501, S502, S503, and S504 described with reference to FIG. 5, overlapping explanation is omitted.

In a case where the present embodiment is used as stated above, the following operation is performed for an inhabitant of a region where regulations for collection of information related to personal information are not strict.

First, in a case where a user views the web page of the owner's site for the first time, since the hide button is not yet pressed, it is determined in S701 that the answer is NO. Further, since information collection is not accepted, it is determined in S705 that the answer is NO. In S706, the inquiry area display flag is turned on. As a result, the inquiry area 310 is displayed in S203.

If a user presses the hide button 313 in the inquiry area 310 (S603: Y), the inquiry area inquiry area is hidden, and the display flag is turned off (S613).

For example, if a user newly views the web page of the owner's site within one day after the press of the hide button 313, it is determined in S701 that the answer is YES. In S702, it is determined that the answer is NO based on a region where the user inhabits, and the process advances to S799. Thus, the inquiry area display flag remains turned off. As a result, the inquiry area (inquiry section) 310 is not displayed in S203.

Accordingly, for an inhabitant of a region where regulations for collection of information related to personal information are not strict, the following advantageous result can be produced: once the hide button 313 is pressed in the inquiry area, the inquiry area (inquiry section) 310 will not be displayed for one day thereafter, for example.

Third Embodiment

Like the second embodiment, the present embodiment is also for exempting the inquiry area from being displayed in a case where a user suspends a decision whether to accept collection of information related to personal information and the user does not inhabit in a region where regulations for collection of information related to personal information are strict.

Figure 8:
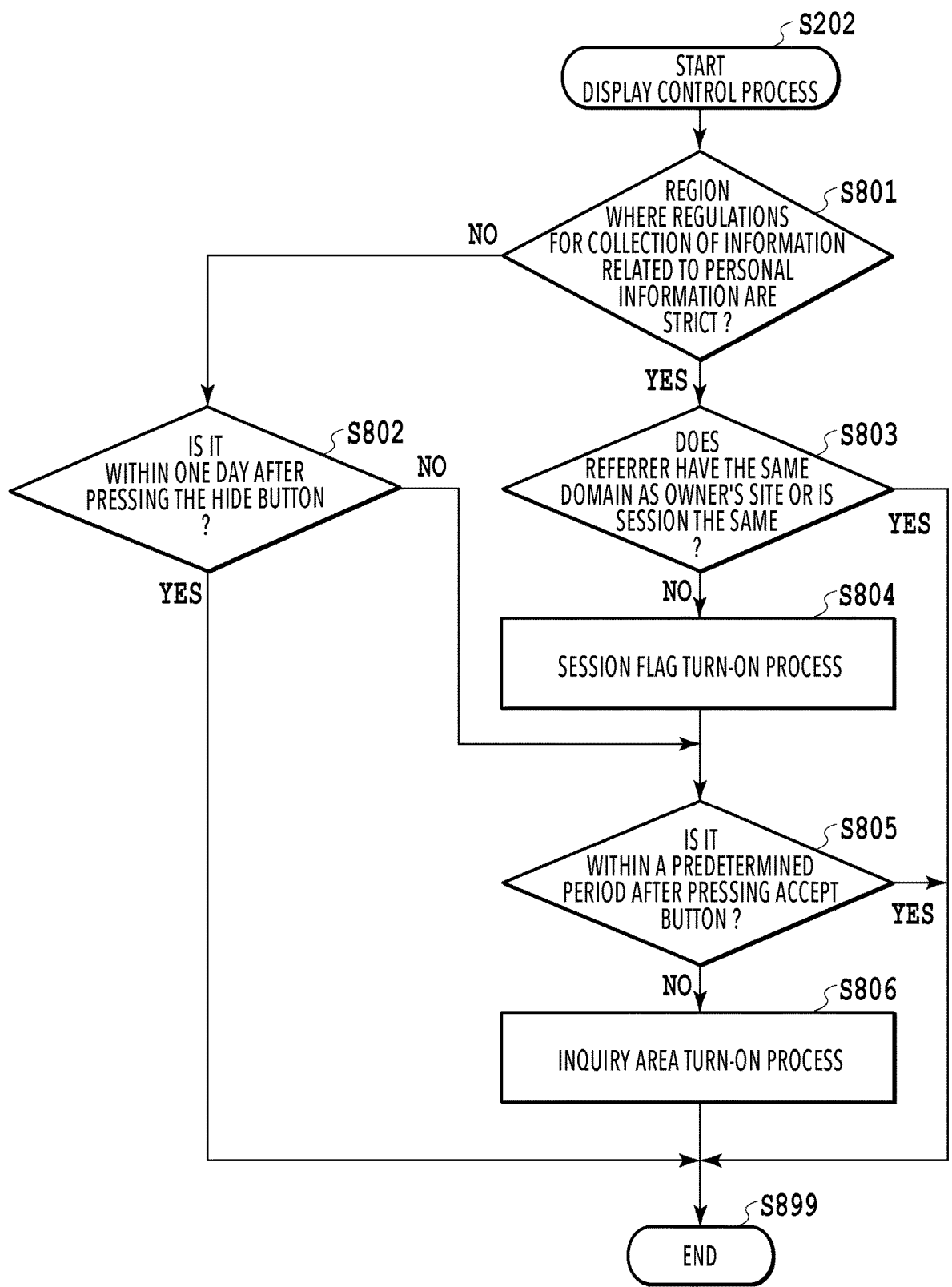
FIG. 8 is a flowchart showing a display control process of a display control program according to a third embodiment.

FIG. 8 is a flowchart showing the details of the display control process (S202) according to the present embodiment. If the display control process of the information display control program is started, the CPU 101 of the information processing apparatus 100 determines in S801 whether an access source region of a user is a region where regulations for collection of information related to personal information are strict. Here, information associating a region with the strictness of regulations for collection of information related to personal information is included in the information display control program. A region indicates, for example, the U.S.A., Japan, Mainland China, EU, or the like. A country and region can be identified from an IP address that the information processing apparatus 100 uses to access the server 110. If the access source region of the user is not a region where regulations for collection of information related to personal information are strict, the CPU 101 determines that the answer is NO in the determination process S801 and advances the process to S802. In contrast, if the access source region of the user is a region where regulations for collection of information related to personal information are strict, the CPU 101 determines that the answer is YES in the determination process S801 and advances the process to S803.

In S802, the CPU 101 determines whether a time that has passed from the date and time of press of the hide button 313 to the present time is within one day, for example. The date and time of press of the hide button 313 is stored in the storage area provided by the program 107 in the storage device 102 or RAM 103.

If the answer is YES in the determination process 802, the CPU 101 advances the process to 899 and finishes the display control process.

On the other hand, if the answer is NO in the determination process S802, the CPU 101 advances the process to S805. Since the processes in S803, S804, S805, and S806 are the same as those in S501, S502, S503, and S504 described with reference to FIG. 5, overlapping explanation is omitted.

In a case where the present embodiment is used as stated above, the following operation is performed for an inhabitant of a region where regulations for collection of information related to personal information are not strict.

First, in a case where a user views the web page of the owner's site for the first time, since the user inhabits in a region where regulations for collection of information related to personal information are not strict, it is determined in S801 that the answer is NO and the process advances to S802. In S802, since the hide button is not yet pressed, it is determined in S802 that the answer is NO and the process advances to S805. Since information collection is not accepted, it is determined in S805 that the answer is NO. In S806, the inquiry area display flag is turned on. As a result, the inquiry area 310 is displayed in S203.

If a user presses the hide button 313 in the inquiry area 310 (S603: Y), the inquiry area is hidden, and the inquiry area display flag is turned off (S613).

For example, if a user newly views the web page of the owner's site within one day after the press of the hide button 313, it is determined that the answer is NO in S801 and is YES in S802, and the process advances to S899. Thus, the inquiry area display flag remains turned off. As a result, the inquiry area (inquiry section) 310 is not displayed in S203.

Accordingly, for an inhabitant of a region where regulations for collection of information related to personal information are not strict, the following advantageous result can be produced: once the hide button 313 is pressed in the inquiry area, the inquiry area (inquiry section) 310 will not be displayed for one day thereafter, for example.

Further, in a case where the present embodiment is used, the following operation is performed for an inhabitant of a region where regulations for collection of information related to personal information are strict.

First, in a case where a user views the web page of the owner's site, since the user inhabits in a region where regulations for collection of information related to personal information are strict, it is determined in S801 that the answer is YES and the process advances to S802. Here, as described above, the processes in S803, S804, S805, and S806 are the same as those in S501, S502, S503, and S504 described with reference to FIG. 5. Accordingly, the operation for a user who inhabits in a region where regulations for collection of information related to personal information are strict is the same as that in the first embodiment. As a result, the same advantageous result as that in the first embodiment can be produced for a user who inhabits in a region where regulations for collection of information related to personal information are strict.

OTHER EMBODIMENTS

It goes without saying that the object of this disclosure can be achieved also by supplying an information processing apparatus or a server with a storage medium storing a problem which implements the functions of the embodiments described above and loading and executing the program by the information processing apparatus or server (or CPU). In this case, the program read from the storage medium implements the functions of the embodiments described above by itself and the storage medium storing the program constitutes this disclosure.

As the storage medium for supplying the program, for example, a flexible disk, hard disk, optical disk, magneto-optical disk, CD, CD-R, magnetic tape, nonvolatile memory card, storage device, and DVD can be used.

Further, in addition to the implementation of the functions of the embodiments described above by the computer executing the read program, part or all of the actual processing may be performed by an OS, interpreter, or the like running on the computer under the instructions from the program. Needless to say, this case also includes a case where the functions of the embodiments described above are implemented by that processing.

Further, the program read from the storage medium may be written to a memory provided in a feature expansion board inserted into the computer or a feature expansion unit connected to the computer. Needless to say, there is included a case where a CPU or the like provided in the feature expansion board or feature expansion unit performs part or all of the actual processing under the instructions from the program and the functions of the embodiments described above are implemented by that processing.

Further, the information processing apparatus can be supplied with the program not only on the Internet but also via a communication means such as a LAN or private line.

If the hide button 313 is pressed, the execution of S202 may be avoided only for a predetermined period as stated below. That is, the date and time of press of the hide button 313 (hide button press date and time) may be stored in the hiding process after the press of the hide button 313 (S601: N, S602: N, S603: Y, S613) and the next process may be executed. That is, before the process advances from S201 to S202, it is determined whether a period from the hide button press date and time to the present time is shorter than a predetermined period. If the period is shorter than the predetermined period, the process bypasses S202 and proceeds to S204. This makes it possible to avoid the display of the inquiry area (inquiry section) 310 while omitting the execution of S202 in a web page newly displayed after the press of the hide button.

In the above embodiments, if the press of a hyperlink is detected, the currently-displayed screen is closed and a screen displaying a web page specified by the hyperlink is opened. However, the process is not limited to this. If a hyperlink is detected, a web page specified by the hyperlink may be displayed in another screen while the currently-displayed screen is kept displayed.

A plurality of tab screens in a browser may share a storage area. In this case, the process of the information display control program is started from S200 in association with a newly-generated tab screen. S201 and S202 are continuously executed. In S501 in S202, since the session is the same (a session flag turned on in the first tab screen is referred to), the answer is determined to be YES. Next, in the execution of S203, a screen is displayed according to an inquiry area display flag set by the information display control program corresponding to the first tab screen. That is, the inquiry area is displayed if the inquiry area display flag is turned on by the information display control program corresponding to the first tab screen. In contrast, the inquiry area is not displayed if the inquiry area display flag is turned off by the information display control program corresponding to the first tab screen.

In the above embodiments, it is determined in S503 that the answer is YES if the information collection acceptance has been received within the period. That is, if the information collection acceptance has been received in the last or earlier session within the period, the inquiry area 310 is not included in a web page first displayed in the current session. In contrast, if the information collection rejection has been received in the last or earlier session within the period, the inquiry area 310 is included in a web page first displayed in the current session. However, the process is not limited to this. Even if the information collection rejection has been received in the last or earlier session within the period, the inquiry area 310 may be excluded from a web page first displayed in the current session. To achieve this, it is only necessary to determine in S503 that the answer is YES not only in a case where a reply indicating information collection acceptance has been received within the period, but also in a case where a reply indicating information collection rejection has been received within the period.

In the above embodiments, it is determined in S503 that the answer is YES if the information collection acceptance has been received within the period. That is, if the information collection acceptance has been received in the last or earlier session within the period, the inquiry area 310 is not included in a web page first displayed in the current session. In contrast, even if the information collection acceptance has been received in the last or earlier session, the inquiry area 310 is included in a web page first displayed in the current session in a case where the time of the acceptance is not within the period. However, the process is not limited to this. Even if the information collection acceptance has been received in the last or earlier session before the period, the inquiry area 310 may be excluded from a web page first displayed in the current session. For example, the period may be indefinitely long. To achieve this, it is only necessary to determine in S503 that the answer is YES if a reply indicating information collection acceptance has been received.

In the above embodiments, it is determined in S501 whether the referrer stored in the storage area of the program 107 includes the same domain name as the domain name of the owner's site as a predetermined area on the Web. However, a different determination may be made. For example, it may be determined whether the referrer includes the same sub-domain name as a specific sub-domain name corresponding to the domain name of the owner's site as a predetermined area on the Web. Alternatively, it may be determined whether the referrer includes the same domain name and specific sub-directory name in the domain as the combination of the domain name of the owner's site and the specific sub-directory name in the domain as a predetermined area on the Web. Alternatively, a domain group including a plurality of domain names relating to the owner's site may be defined as a predetermined area on the Web and it may be determined whether the referrer includes any domain name included in the domain group.

In the above embodiments, the information display control program is included in each web page. However, the information display control program is not limited to this and may be stored in a predetermined area of the same domain and called from each web page downloaded to the information processing apparatus 100. Also in this case, the information processing program is stored in the RAM 103 and then executed by the CPU 101. Each web page does not have to include the information display control program and only needs to have descriptions for calling the information processing program.

In the above embodiments, the hyperlinks 321 and 322 can be pressed before any of the accept button 311, the reject button 312, and the hide button 313 is pressed, but are not limited to this. The press of the hyperlinks 321 and 322 may be disabled unless any of the accept button 311, the reject button 312, and the hide button 313 is pressed. In this case, the current web page cannot transition to another web page unless any of the accept button 311, the reject button 312, and the hide button 313 is pressed. As a result, the inquiry area can be prevented from being displayed in a transition destination web page.

The above embodiments have described the information display control program for controlling showing/hiding of the inquiry area concerning whether a user agrees with collection of information related to personal information. Examples of the information related to personal information include not only a cookie but also positional information, browsing history, purchase history, IP address, terminal-specific ID, and advertising ID.

The information display control program can also be used to control showing/hiding of an inquiry area for a user to input whether to agree with execution of a specific program in the information processing apparatus 100. The specific program is, for example, a program described in or called from a web page.

This disclosure can be implemented also by a process in which a program that implements one or more functions of the above embodiments is supplied to a system or apparatus via a network or storage medium and one or more processors in a computer of the system or apparatus read and execute the program. This disclosure can be implemented also by a circuit that implements one or more functions (such as an ASIC).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-128259, filed on Aug. 10, 2022, which is hereby incorporated by reference wherein in its entirety.

What is claimed is:

1. A control method for an information processing apparatus, the control method comprising: a first control step in which in a case where a second web page corresponding to a second domain different from a first domain is displayed based on an operation in a first web page corresponding to the first domain, control is performed such that an inquiry area for receiving from a user a first operation indicating acceptance of use of a cookie is displayed together with the second web page; and a second control step in which in a case where a third web page corresponding to the second domain is displayed based on an operation in the second web page, control is performed based on a referrer in the third web page such that the inquiry area is not displayed even without receipt of the first operation or a second operation indicating rejection of use of the cookie in the inquiry area displayed together with the second web page, wherein on the basis that the first operation is received in the inquiry area, a process using the cookie is enabled in a web page corresponding to the second domain.

2. The control method according to claim 1, comprising: a third control step in which control is performed such that the inquiry area is not displayed in a case where the third web page is displayed based on an operation in the second web page and either of the first operation and the second operation has been received in the inquiry area displayed together with the second web page.

3. The control method according to claim 1, wherein a program which performs control based on the referrer in the third web page such that the inquiry area is not displayed is a program provided by a server providing the third web page.

4. The control method according to claim 3, wherein on the basis that the referrer in the third web page corresponds to the second domain, control is performed such that the inquiry area is not displayed.

5. The control method according to claim 1, wherein in a case where the second web page is displayed based on an operation in the first web page, control is performed based on a referrer in the second web page such that the inquiry area is displayed.

6. The control method according to claim 5, wherein on the basis that the referrer in the second web page corresponds to a domain different from the second domain, control is performed such that the inquiry area is displayed.

7. The control method according to claim 1, wherein control is performed such that the inquiry area is displayed in a case where the second web page is displayed based on an operation in the first web page and a predetermined time has passed since the first operation was performed in the inquiry area displayed together with any web page corresponding to the second domain, and control is performed such that the inquiry area is not displayed in a case where the second web page is displayed based on an operation in the first web page and the predetermined time has not passed since the first operation was performed in the inquiry area displayed together with any web page corresponding to the second domain.

8. The control method according to claim 1, wherein control is performed such that the inquiry area is displayed in a case where the second web page is displayed based on an operation in the first web page and a value corresponding to execution of the first operation in the inquiry area is set as information concerning acceptance of use of the cookie, and control is performed such that the inquiry area is not displayed in a case where the second web page is displayed based on an operation in the first web page and a value corresponding to execution of the first operation in the inquiry area is not set as information concerning acceptance of use of the cookie.

9. The control method according to claim 1, wherein the inquiry area includes a hide button for hiding the inquiry area, and in a case where the hide button is operated, the inquiry area is hidden while a value set as information concerning acceptance of use of the cookie is not changed.

10. The control method according to claim 1, wherein after the first operation is received from a user in the inquiry area, a value set as information concerning acceptance of use of the cookie is a first value, after the second operation is received from a user in the inquiry area, a value set as information concerning acceptance of use of the cookie is a second value, and in a case where neither the first operation nor the second operation is received from a user in the inquiry area, a value set as information concerning acceptance of use of the cookie is a third value.

11. The control method according to claim 1, wherein the inquiry area includes a first button to receive the first operation from a user and a second button to receive the second operation from a user.

12. The control method according to claim 1, wherein in a case where an arbitrary web page corresponding to the second domain is displayed, a determination process is performed to determine whether the arbitrary web page is displayed based on an operation in a web page corresponding to the first domain or based on an operation in a web page corresponding to the second domain, and whether the inquiry area is displayed together with the arbitrary web page is controlled based on a result of the determination process.

13. The control method according to claim 1, wherein the cookie includes information on at least any one of a type and model of a printing apparatus.

14. The control method according to claim 1, wherein in a case where the first operation is received from a user, a process using the cookie is executed by any web page corresponding to the second domain.

15. The control method according to claim 14, wherein The process using the cookie is at least any one of display of a manual of a printing apparatus and display concerning an operation for an initial setup of the printing apparatus.

16. The control method according to claim 1, wherein whether control is performed such that the inquiry area is displayed or control is performed such that the inquiry area is not displayed is controlled based on whether a predetermined time has passed since the first operation was performed in the inquiry area displayed together with any web page corresponding to the second domain.

17. The control method according to claim 1, wherein whether control is performed such that the inquiry area is displayed or control is performed such that the inquiry area is not displayed is controlled based on whether an access source region of a user is a predetermined region.

18. The control method according to claim 1, wherein the second domain is a domain acquired by a predetermined vendor that is a vendor of a printing apparatus.

19. A non-transitory storage medium storing a program, the program causing a computer of an information processing apparatus to execute:
 a first control step in which in a case where a second web page corresponding to a second domain different from a first domain is displayed based on an operation in a first web page corresponding to the first domain, control is performed such that an inquiry area for receiving from a user a first operation indicating acceptance of use of a cookie is displayed together with the second web page; and
 a second control step in which in a case where a third web page corresponding to the second domain is displayed based on an operation in the second web page, control is performed based on a referrer in the third web page such that the inquiry area is not displayed even without receipt of the first operation or a second operation indicating rejection of use of the cookie in the inquiry area displayed together with the second web page,
 wherein on the basis that the first operation is received in the inquiry area, a process using the cookie is enabled in a web page corresponding to the second domain.

20. An information processing apparatus, comprising:
 one or more processors which execute a program to comprise:
 a first control unit configured to, in a case where a second web page corresponding to a second domain different from a first domain is displayed based on an operation in a first web page corresponding to the first domain, perform control such that an inquiry area for receiving from a user a first operation indicating acceptance of use of a cookie is displayed together with the second web page; and
 a second control unit configured to, in a case where a third web page corresponding to the second domain is displayed based on an operation in the second web page, perform control based on a referrer in the third web page such that the inquiry area is not displayed even without receipt of the first operation or a second operation indicating rejection of use of the cookie in the inquiry area displayed together with the second web page,
 wherein on the basis that the first operation is received in the inquiry area, a process using the cookie is enabled in a web page corresponding to the second domain.

* * * * *